L. N. BOURDEAU.
GREASE CUP.
APPLICATION FILED JUNE 14, 1920.
1,405,566.
Patented Feb. 7, 1922.
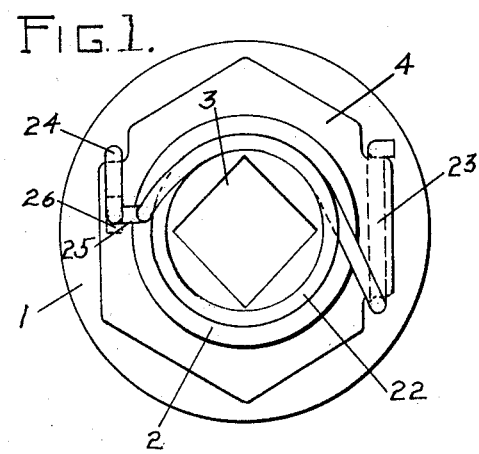
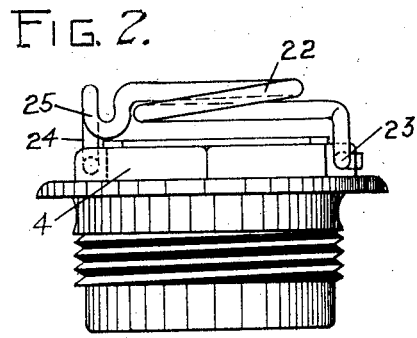
INVENTOR
Leon N. Bourdeau,
By Walter N. Haskell,
his ATTORNEY

UNITED STATES PATENT OFFICE.

LEON N. BOURDEAU, OF ROCK ISLAND, ILLINOIS, ASSIGNOR OF ONE-HALF TO JOHN G. SORENSON, OF DAVENPORT, IOWA.

GREASE CUP.

1,405,566.  Specification of Letters Patent.  Patented Feb. 7, 1922.

Application filed June 14, 1920. Serial No. 388,751.

*To all whom it may concern:*

Be it known that I, LEON N. BOURDEAU, a citizen of the United States, residing at Rock Island, in the county of Rock Island and State of Illlinois, have invented certain new and useful Improvements in Grease Cups, of which the following is a specification.

My invention has reference to grease cups, such as are commonly employed on the connecting rods of locomotives, for the purpose of holding lubricants to be supplied to the bearings thereof. The common form of these devices consists of a cylindrical bushing adapted for seating in an opening in the connecting rod, and provided with a threaded plug for retaining the lubricant in place. As the lubricant becomes heated from the friction of the parts in proximity thereto it has a tendency to expand, and exert a force outwardly. This tendency, coupled with the vibration of the parts occasioned by the movement of the engine, results in the plugs working outwardly from their seats and becoming lost.

The purpose of the present invention is to provide a spring-controlled member, hingedly attached to one side of the grease-cup bushing, and releasably connected at the opposite side thereof, such member forming a closure for the end of the grease-cup, and interfering with accidental release of the plug therefrom. Said member is also provided with a central opening, permitting the use of a wrench with the plug, to adjust the position thereof. By the use thereof a great saving of the plugs and lubricant is effected.

In the drawings, in which several different styles of the invention are illustrated:

Fig. 1 is a plan view of the invention.

Fig. 2 is a side elevation thereof.

In the drawings 1 represents a bushing, adapted for engagement with a threaded opening in a connecting rod, and interiorly threaded to receive a similarly threaded plug 2, having an opening 3 in its outer end for engagement by a wrench, to turn such plug inwardly or outwardly, as desired. Said bushing is also provided with a head 4, of hexagonal formation, with which such bushings are usually provided.

The plug 2 is held normally in place by means of a wire coil 22, ending in a bar 23, pivoted in one side of the head 4. At the opposite side said coil is provided with a catch 24, connected with the part 22 by a loop 25. The end of the catch 24 is capable of being engaged with an opening 26 in the head 4, the tension of the coil 22 operating to hold the same normally therein. Through the opening in the coil the plug 2 may be manipulated, if desired. When it is desired to remove the plug, the thumb of the operator is placed against the loop 25 and the end of the catch 24 forced out of the opening 26. The coil can then be turned to one side upon the pivot 23. To again lock the plug in place the operation is reversed.

What I claim as my invention, and desire to secure by Letters Patent, is:

1. In a device of the class described, in combination with a bushing, and plug held adjustably therein, a resilient coil having a hinged connection with said bushing at one side thereof, and a catch at the opposite side adapted for releasable connection with said bushing.

2. In a device of the class described, in combination with a grease cup bushing, and plug adjustably held therein; a resilient coil having a hinged connection with said bushing at one side thereof, and provided at the other side with a catch adapted for releasable connection with said bushing, said catch being united with said coil by a loop capable of operation by the hand of the user.

In testimony whereof I affix my signature.

LEON N. BOURDEAU.